United States Patent Office 3,279,819
Patented Oct. 18, 1966

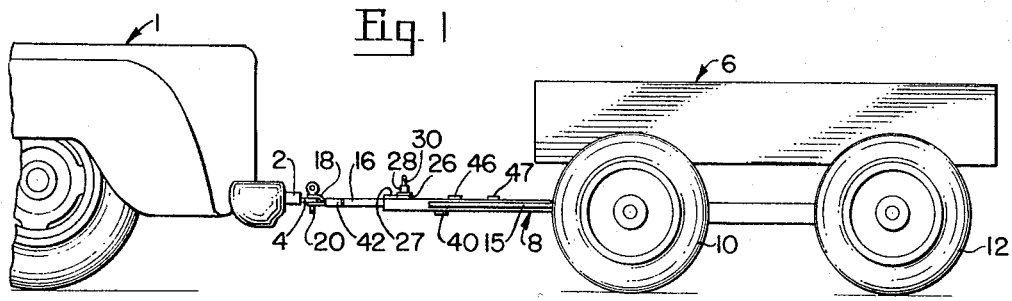
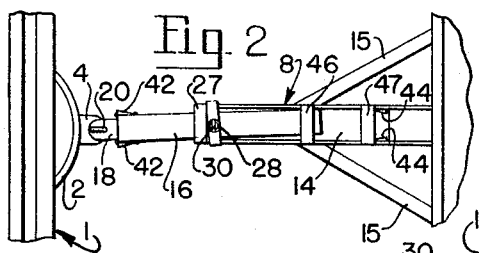
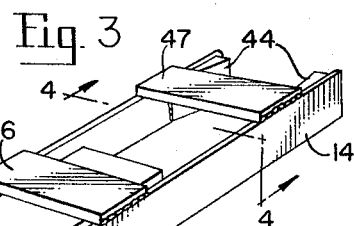
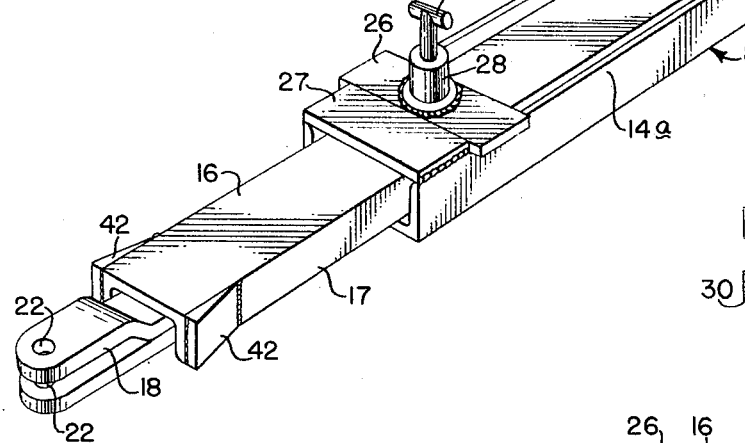
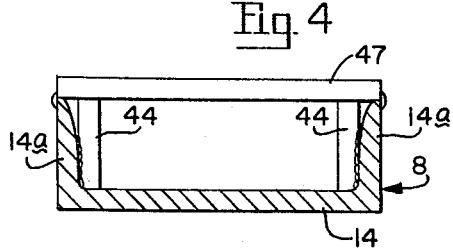
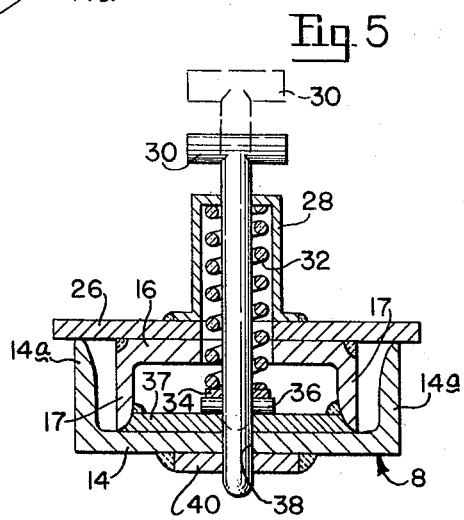
WILLIAM H. EDMONDS
*INVENTOR.*
BY Wayland D. Keith
HIS AGENT

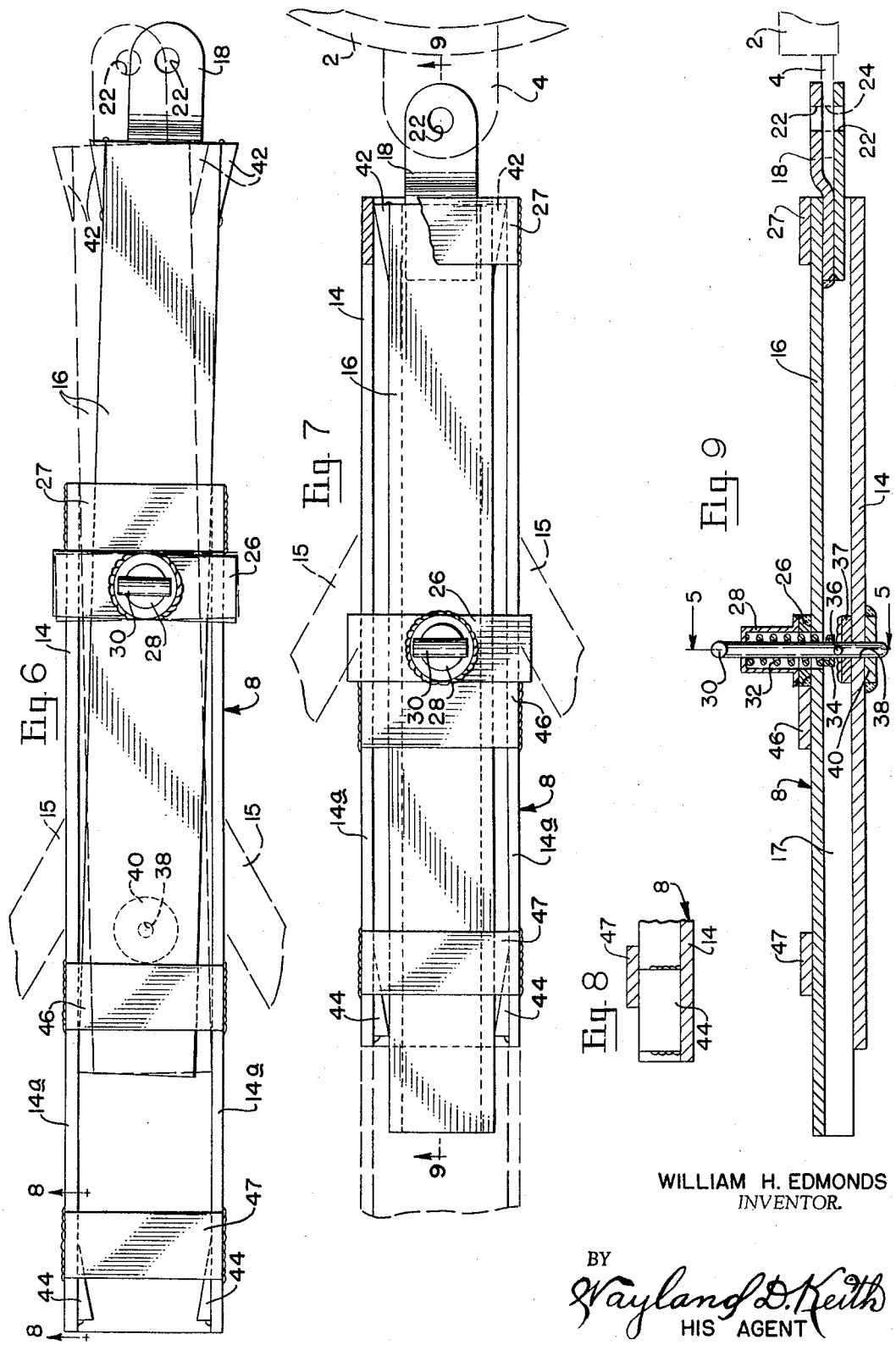

3,279,819
INDEPENDENTLY MOVABLE TRAILER
TONGUE SECTION
William H. Edmonds, Quanah, Tex., assignor of one-half to William D. Edmonds, Quanah, Tex., and one-half to William R. Tabor, Quanah, Tex.
Filed Oct. 30, 1964, Ser. No. 407,811
4 Claims. (Cl. 280—478)

This invention relates to improvements in a trailer tongue and more particularly to a trailer tongue such as used on farm vehicles and the like, which usually have four wheels, and which utilize a hitch to connect to a car, pickup, tractor or other type tow vehicle.

Various trailer tongues and hitches have been proposed heretofore, but these, for the most part, were movable only with the front wheels of the trailer and therefore, with heavily loaded trailers, it was often difficult for an operator to back to the exact spot to enable a hitch pin to be passed through the holes in the hitch of the tongue and the hole in the hitch of the pickup, car, tractor or the like.

The present device is so constructed as to enable a car, pickup, or tractor to be backed into an approximate position for connecting the hitch of the tongue to the tractor, whereupon, a portion on the tongue may be moved longitudinally, within limits to enable the connection of the hitch on the tongue with the hitch on the tow vehicle. However, if the hitch element or holes in the tongue and the hitch element or holes in the tractor hitch are not in medially aligned relation with the tongue, the end of the extended tongue of the trailer may be moved from side to side to enable the hitch element or holes to be brought into register to enable a hitch pin to be passed through the aligned holes in the hitch of the trailer tongue and the hole, or holes, in the hitch on the tow vehicle or a hitch element thereon to be connected.

The trailer tongue is so constructed that, once the hitch pin interengages the holes of the hitch of the trailer tongue and the hitch of the tow vehicle, the tow vehicle may be backed, which will cause the longitudinally movable tongue portion to medially align within the main tongue body and a spring pressed latch or bolt will move into register with a hole in the main tongue body and the longitudinally movable tongue portion of the trailer will be locked in integral relation with the main tongue body of the trailer.

The present tongue can be made of such length as to be standard equipment on the trailer, as manufactured, or it can be made of a relatively short piece of structural steel and attached to the tongue of an old type trailer, in order to adapt the present trailer tongue thereto.

An object of this invention is to provide a trailer tongue which will enable the hitching of a trailer to a tow vehicle when the hitches of the trailer and of the tow vehicle are not fully aligned, thereby enabling one person to readily connect a trailer with a tow vehicle.

Another object of the invention is to provide, for a trailer, a longitudinally extensible tongue to enable the hitches of the trailer and of the tow vehicle to be readily coupled.

Another object of the invention is to provide a longitudinally movable tongue which may be readily moved from side to side when in an extended position, and which is immovable from side to side when in a fully telescoped position.

A further object of the invention is to provide a longitudinally movable tongue portion for a trailer, which will antomatically latch when in fully telescoped position to enable the trailer to be pulled over the terrain.

Still another object of the invention is to provide a trailer tongue which has a longitudinally extensible portion therein, which portion has wedge-like members on each side of the distal end thereof, and the inner end of such movable portion passes between the wedges of the main trailer tongue so as to center the movable portion of the tongue within the complementary portion of the tongue when in telescoped position.

Still another object of the invention is to provide a trailer tongue which may be readily attached to the outer end of an existing trailer tongue to enable standard trailer tongues to be converted into a "quick hitch type" trailer tongue.

Still a further object of the invention is to provide a quick hitch trailer tongue which is simple in construction, relatively easy to manufacture and which is low in the cost of manufacture.

With these objects in mind, and others which will become manifest as the description proceeds, reference is to be had to the accompanying drawing in which like reference characters designate like parts in the several views thereof, in which:

FIG. 1 is a fragmentary, side elevational view of a truck showing a four wheel trailer having a tongue, which tongue is interconnected with a hitch on a tow truck;

FIG. 2 is a plan view of the trailer tongue with a portion thereof in extended position, showing the trailer tongue mounted on a fragmentary portion of a trailer, and showing the tongue in extended position and connected with a fragmentary portion of a tow truck, with the truck hitch being shown out of medial alignment with respect to the trailer tongue;

FIG. 3 is a perspective view of the trailer tongue shown apart from the trailer, and showing the longitudinally movable part thereof in extended relation;

FIG. 4 is a sectional view taken on the line 4—4 of FIG. 3, looking in the direction indicated by the arrows;

FIG. 5 is a sectional view taken on the like 5—5 of FIG. 9, looking in the direction indicated by the arrows, showing the spring-pressed slide bolt in full outline in an engaged position, the disengaged position of the slide bolt being shown in dashed outline;

FIG. 6 is a view similar to FIG. 2, but on an enlarged scale to show the details of construction, the longitudinally movable portion of the trailer tongue being shown in full outline in one lateral position, and showing the longitudinally extensible tongue portion in dashed outline in another lateral position;

FIG. 7 is an enlarged plan view of the trailer tongue in telescoped relation and showing the centering wedges inter-engaging the relatively slidable members so as to center the longitudinally movable portion of the tongue when the tongue is in latched position for towing, showing the manner of attaching the tongue portion to a conventional tongue in dashed outline, and further showing a tow vehicle hitch in dashed outline in position for insertion of a hitch pin through the hitches of the tongue and the tow vehicle;

FIG. 8 is a sectional view taken on the line 8—8 of FIG. 6, looking in the direction indicated by the arrows; and FIG. 9 is a longitudinal view taken on the line 9—9 of FIG. 7, looking in the direction indicated by the arrows.

With more detailed reference to the drawing, the numeral 1 designates generally a tow vehicle such as a truck, tractor or the like which has a tow beam 2, with a hitch 4, secured thereto. A trailer is designated generally by the numeral 6, which trailer 6 has a tongue, designated generally at 8, therein, which tongue is adapted to steer front wheels 10 of the trailer, as the trailer is moved over the terrain by the tow vehicle. The present trailer is shown to have rear wheels 12, to enable carrying heavy loads over relatively soft terrain.

The tongue 8, of the trailer, is of the character which moves the wheels 10 about a "fifth wheel" (not shown) and when the trailer 6 is heavily loaded, it is very difficult to move the main tongue body 14, which is preferably made of channel, from side to side to enable the connecting of the trailer to the tow vehicle. However, the present device provides an elongated, extensible or longitudinally movable tongue portion 16 which telescopes into the channel member of the main tongue body 14, when the longitudinally movable tongue portion 16 is in one position, and which extends outward a longitudinally sufficient distance as to enable ready connection of the trailer hitch 18 with the tow vehicle hitch 4, by the insertion of a hitch pin 20 through holes 22 and 24 of the respective hitches.

The longitudinally movable tongue portion 16 of the tongue 14 has a bar 26 welded thereacross, which bar is movable therewith forming a stop means. The bar 26 has a spring housing 28 mounted thereon. The spring housing is holed at the upper end thereof and has a slide bolt 30 therethrough and through a spring 32 within spring housing 28. A washer 34 surrounds the slide bolt 30 intermediate the spring 32 and a pin 36, which pin 36 passes transversely through the slide bolt 30. The spring 32 enables the slide bolt 30 to be moved from the position as shown in full outline in FIG. 5 to the position shown in dashed outline therein, against the tension of spring 32, to enable the slide bolt 30 to be withdrawn from a hole 38 within the main tongue body 14 and from the boss 40 on the lower side of the channel of the main tongue body 14.

The slide bolt 30 holds the longitudinally movable tongue portion 16 in telescoped relation, as shown in FIG. 7. When the tongue is in telescoped position, as shown in FIG. 7, the wedges 42, secured to each side of the distal end of the longitudinally movable portion 16 of the tongue, will center the portion 16 mediate the inner faces 14a of the channel portion of the main tongue body 14, and with the longitudinally movable tongue portion 16 in this position, the inner end will pass between wedges 44, which are secured to the inner faces 14a of the flanges of the channel of the main tongue body 14, so as to wedgingly direct the inner end of the longitudinally movable tongue portion 16 therebetween in close fitting relation. The wedges form centering means for the longitudinally movable tongue portion. With the longitudinally movable tongue portion 16 moved into this position, the slide bolt 30 will be moved along the upper face of the web of the channel of the main tongue body 14 under spring pressure into aligned relation with hole 38 in the channel of the main tongue body 14, as the bar 26, secured to longitudinally movable tongue portion 16, abuts with stop bar 46 which is secured to the main tongue body 14, the slide bolt 30 will be aligned with hole 38, and the spring 32 will move the slide bolt downward therethrough, as indicated in full outline in FIG. 5. By having the wedges 42 and 44 arranged in the manner described, when the longitudinally movable tongue portion 16 is extended, as indicated in FIGS. 1, 2, 3 and 6, the hitch 18 of the trailer may be moved from side to side, as well as longitudinally, so as to readily couple hitch 18 onto the longitudinally movable tongue portion 16 with the hitch 4 of the tow vehicle.

As a matter of example, in one size of the "quick hitch" trailer tongue, the longitudinal movement of movable tongue portion 16 of the main tongue body 14 may be readily made to move longitudinally about twenty inches, and the side-to-side movement thereof may be two to four inches. This would mean that the tow vehicle could be connected to the trailer, if it is within the twenty inch longitudinal movement and within the two to four inches of a laterally aligned relation with respect to the medial alignment with the main tongue body 14, thereby saving much time and effort on the part of the operator in moving the tow vehicle back and forth to obtain the precise point of alignment, which is not necessary with the longitudinally and laterally movable tongue portion 16. However, with the present trailer tongue, which has longitudinal and lateral movement of the tongue portion, a tow vehicle may be connected to a trailer in a minimum of time.

The main tongue body 14 is preferably made of a channel member, the flanges of which channel member face upwardly. Braces 15 may extend, at an angle, from the main tongue body 14 and be secured to the front axle of the trailer, so as to move the front axle about a king pin or fifth wheel in some forms of trailers, as is well known in the art of trailers.

The longitudinally movable tongue portion 16 is preferably made of a channel member, which is of lesser width than the distance between the inside faces 14a of the channel member of the main tongue body 14. The channel of the longitudinally movable tongue portion 16 preferably has the flanges 17 thereof downturned, so bar 26 will slide between the stop bar 27 and the stop bar 46 on the main tongue body 14. In this manner the longitudinally movable tongue portion 16 is always in guided relation within the main tongue body 14 and cannot become dislocated. A further bar 47 extends across and is secured to channel member of the main tongue body 14 and guides the inner end of movable longitudinal tongue portion 16 in guided relation between wedges 44. It is preferable to have a bar 37 extending between the downturned flanges 17 of the channel which forms the longitudinally movable tongue portion 16. The bar 37 is secured to the downturned flanges 17 as by welding, which bar 37 forms a stop or abutment for pin 36, when the slide bolt 30 is in the lowermost position.

Having thus clearly shown and described the invention, what is claimed as new and desired to be secured by Letters Patent is:

1. A tongue for a trailer comprising:
   (a) an elongated channel member forming main tongue body,
       (i) a pair of bars secured to the legs of said channel member transversely thereof and spaced apart longitudinally to form abutments,
   (b) a second elongated body forming a longitudinally movable tongue portion fitted within said channel member of the main tongue body in sliding relation,
   (c) a bar forming an abutment secured to said longitudinally movable tongue portion transversely thereof and positioned intermediate said pair of transverse bars secured to the legs of said channel member for movement between said pair of bars,
   (d) said longitudinally movable tongue portion being laterally movable with respect to said elongated channel member when said longitudinally movable tongue portion is in one position,
       (i) wedge means associated with said movable tongue portion and said elongated channel member to secure said movable tongue portion against lateral movement when said tongue is in another position,
   (e) a hitch on said movable tongue portion to connect with a tow vehicle, and
       (i) bolt means mounted in said longitudinally movable tongue portion, and being movable therewith, to lock said longitudinally movable tongue portion in a retracted position and against lateral movement with respect to said main tongue body when said longitudinally movable tongue portion is moved inward until said transverse bar thereon is in abutting relation with one of said transverse bars of said pair of bars secured to the legs of said channel member.

2. A tongue for a trailer comprising:
(a) an elongated channel member, the flanges of which are upwardly facing to form a main tongue body,
(b) a second elongated tongue portion telescoped into said channel member in sliding relation,
(c) means on the outer end of said second elongated tongue portion to connect said second elongated tongue portion to a tow vehicle,
(d) bars which form stops secured to the upper end of the flanges of said channel member which forms the main tongue body, which retaining bars are spaced apart,
(e) a bar welded to said second elongated tongue portion,
  (i) said bar being adapted to abut with one of said stop bars when said second elongated tongue portion is in one extreme position, and
  (ii) said bar being adapted to abut with the other of said stop bars when said second elongated tongue portion is in the other extreme position,
(f) a bolt securing said second elongated tongue portion in fixed relation with respect to said main tongue body when said second elongated tongue portion is in retracted position,
(g) wedge members secured to the inner faces of said elongated channel member of said main tongue body a spaced distance from the distal end thereof and which wedges slope forwardly and outwardly,
(h) said second elongated tongue portion having a wedge secured on each side thereof near the distal end thereof,
  (i) which wedge members slope inwardly and rearwardly, with the greatest width across the wedge members and
  (ii) the second elongated tongue portion being not greater than the width between the inner faces of the upwardly facing flanges of said channel member which forms the main tongue body,
(i) said wedge members on the inner faces of said channel of the main tongue body being spaced apart a distance of at least the width of said second elongated tongue portion, so, when said second elongated member is telescoped into said first channel member,
  (i) said wedges on said second elongated tongue portion will pass into said channel member which forms the main tongue body in sliding relation, and
  (ii) said second elongated tongue portion will extend through the opening formed between said wedges on said first channel member, which forms said main tongue body.

3. A tongue for a trailer, as defined in claim 2, wherein:
(a) said elongated channel member having a hole formed therein,
(b) said second longitudinally movable tongue portion is a channel member,
(c) said second channel member having downturned flanges thereon, and
(d) said bolt having a coil spring therearound to urge said bolt into engaging position with said hole in said first channel member.

4. A hitch for attachment to a tongue of a trailer, comprising:
(a) an elongated first channel member with a main tongue body,
(b) the flanges of said first channel member being upwardly facing,
(c) transverse bars extending across said first channel member and being weldably secured thereto at spaced, longitudinal intervals therealong,
(d) a wedge member weldably secured to each inner face of the flanges of said channel member a spaced distance rearwardly from the distal end thereof,
  (i) each said wedge member being tapered outwardly and forwardly,
(e) said first channel having a hole formed in the web thereof intermediate the length thereof,
(f) a second elongated channel member which forms a longitudinally movable tongue portion telescoped into said first channel member and the width of said second elongated channel member being no greater than the distance between the narrowest space between said wedges,
(g) a wedge secured to each side of said second channel member near the distal end thereof,
  (i) which wedges slope inwardly and rearwardly,
  (ii) the greatest width between said wedges on said second channel member being not greater than the width between the inner faces of said flanges on said first channel,
(h) a spring pressed slide bolt mounted on said second channel member and adapted to register with said hole formed in the web of said first channel member when said elongated second channel member is in the rearmost position,
  (i) to have free but limited swinging, lateral movement when said channel members are disengaged from the respective wedge members which form guides, and
(i) hitch means on the distal end of said tongue to engage with the hitch of a tow vehicle.

References Cited by the Examiner
UNITED STATES PATENTS

| | | | |
|---|---|---|---|
| 2,820,649 | 1/1958 | Demarest | 280—478 |
| 2,845,281 | 7/1958 | Holder | 280—478 |
| 2,973,971 | 3/1961 | Oddson | 280—478 |
| 3,019,032 | 1/1962 | Oehler et al. | 280—478 |
| 3,099,462 | 7/1963 | Lent | 280—478 |

LEO FRIAGLIA, *Primary Examiner.*